United States Patent
Hon et al.

(10) Patent No.: US 7,852,031 B2
(45) Date of Patent: Dec. 14, 2010

(54) MACHINE TOOL HAVING FUNCTION OF CORRECTING MOUNTING ERROR THROUGH CONTACT DETECTION

(75) Inventors: Yonpyo Hon, Yamanashi (JP); Kenzo Ebihara, Yamanashi (JP); Tomohiko Kawai, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 332 days.

(21) Appl. No.: 12/175,823

(22) Filed: Jul. 18, 2008

(65) Prior Publication Data
US 2009/0033271 A1 Feb. 5, 2009

(30) Foreign Application Priority Data
Jul. 31, 2007 (JP) .............................. 2007-198791

(51) Int. Cl.
*B23Q 35/127* (2006.01)
*G05B 1/06* (2006.01)
(52) U.S. Cl. ....................... 318/572; 318/577; 318/578; 318/640; 700/161; 700/173; 33/503
(58) Field of Classification Search .................. 318/572, 318/577, 578, 632, 640; 250/559.29; 700/161, 700/173; 219/124.34; 33/503; 156/361
See application file for complete search history.

(56) References Cited

U.S. PATENT DOCUMENTS

| | | | | |
|---|---|---|---|---|
| 4,997,510 A | * | 3/1991 | Shinno et al. ................ | 156/361 |
| 5,006,999 A | * | 4/1991 | Kuno et al. .................. | 700/253 |
| 5,140,239 A | * | 8/1992 | Matsuura ..................... | 318/577 |
| 5,274,563 A | * | 12/1993 | Matsuura et al. ............ | 700/161 |
| 5,345,687 A | * | 9/1994 | Matsuura et al. ............. | 33/503 |
| 5,426,356 A | * | 6/1995 | Matsuura et al. ............ | 318/578 |
| 5,495,090 A | * | 2/1996 | Mukai et al. ........... | 219/124.34 |
| 5,550,330 A | * | 8/1996 | Matsuura et al. ......... | 178/18.02 |

(Continued)

FOREIGN PATENT DOCUMENTS

CN 1775442 A 5/2006

(Continued)

OTHER PUBLICATIONS

Notice of Reasons for Rejection for Japanese Application No. 2007-198791 dated Jan. 27, 2009.

(Continued)

*Primary Examiner*—Paul Ip
(74) *Attorney, Agent, or Firm*—Lowe Hauptman Ham & Berner LLP

(57) ABSTRACT

A machine tool capable of automatically correcting an orientation of a workpiece or machining attachment based on detection results from position detectors that the machine tool inherently has. The machine tool comprises: position detectors; position deviation determining means; contact detection means that detects a contact between a probe and a surface of the workpiece or the machining attachment based on a position deviation; movable axis stopping means; coordinate value detection means; inclination determining means; and correction means. The inclination determining means moves linear axes to perform detection of contacts between the probe and the surface of the workpiece or the machining attachment at least two different points, and determines an inclination of the workpiece or the machining attachment using the obtained coordinate values. The correction means corrects a mounting error of the workpiece or the machining attachment, or corrects the machining program based on the determined inclination.

10 Claims, 16 Drawing Sheets

U.S. PATENT DOCUMENTS

| | | | |
|---|---|---|---|
| 6,233,497 B1 * | 5/2001 | Kachi et al. | 700/173 |
| 7,211,762 B2 | 5/2007 | Kinoshita et al. | |
| 7,392,692 B2 * | 7/2008 | Noda | 73/105 |
| 2005/0263727 A1 * | 12/2005 | Noda | 250/559.29 |

FOREIGN PATENT DOCUMENTS

| | | |
|---|---|---|
| JP | 63-312057 | 12/1988 |
| JP | 05-250019 A | 9/1993 |
| JP | 6106457 A | 4/1994 |
| JP | 2004-192152 A | 7/2004 |
| JP | 2006159396 A | 6/2006 |
| JP | 2006-212765 A | 8/2006 |
| JP | 2006-289524 A | 10/2006 |

OTHER PUBLICATIONS

Office Action for Chinese Patent application 2008101447182, issued Oct. 30, 2009.

* cited by examiner

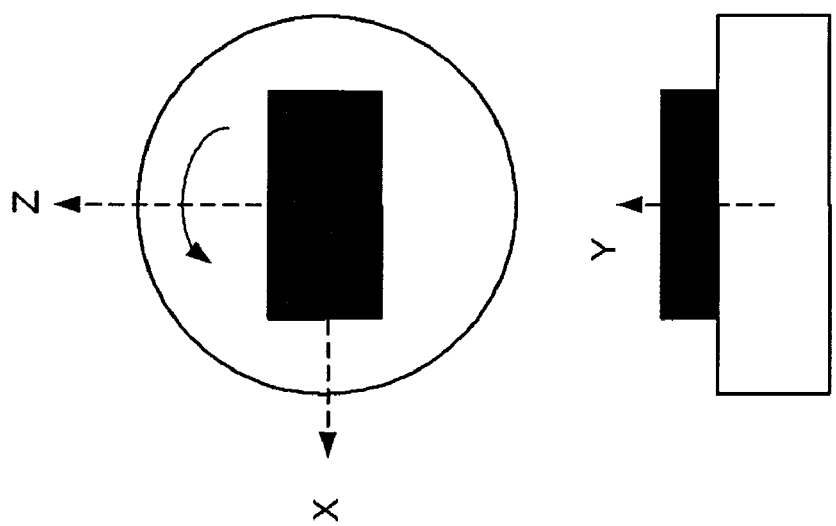
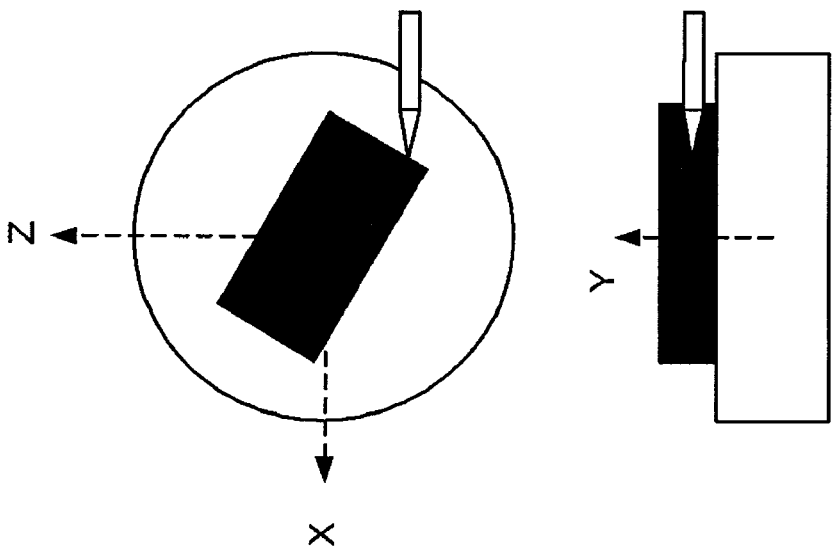
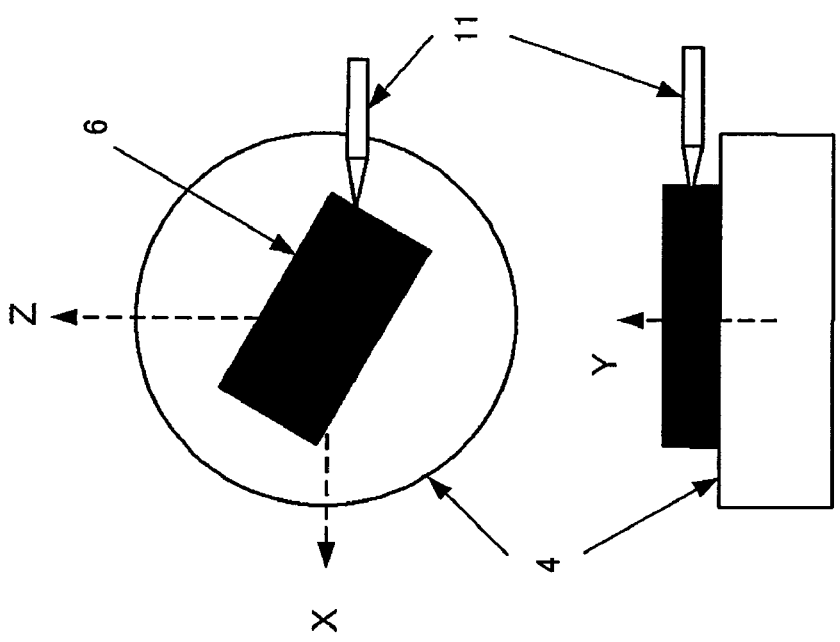

MACHINE TOOL HAVING FUNCTION OF CORRECTING MOUNTING ERROR THROUGH CONTACT DETECTION

RELATED APPLICATIONS

The present application is based on, and claims priority from, Japanese Application Number 2007-198791, filed Jul. 31, 2007, the disclosure of which is hereby incorporated by reference herein in its entirety.

BACKGROUND OF THE INVENTION

1. Field of the Invention

The present invention relates to machine tools, and more particularly to a machine tool having the function of correcting a mounting error through contact detection.

2. Description of Related Art

As techniques for detecting inclination of a workpiece to be cut by a cutting machine, there has been known a technique in which a displacement detector is brought into contact with a reference plane of the workpiece or of a machining attachment and then the reference plane is traced with the displacement detector to acquire data about the inclination. According to this technique, the rotary axis on which the workpiece or the machining attachment is mounted is manually moved in accordance with the acquired data, by using the operator's panel or the like, to adjust the orientation of the workpiece. After the adjustment, the displacement detector is again brought into contact with the reference plane of the workpiece or machining attachment to ascertain whether the mounting error of the workpiece or machining attachment has become smaller than an allowable value or not. If the mounting error is greater than the allowable value, the adjustment is repeated until the mounting error becomes smaller than the allowable value (cf. Examined Japanese Patent Publication No. H06-26787).

This technique requires, however, an additional measuring instrument serving as the displacement detector, such as an electric micrometer, and moreover, the accuracy in and the time required for the orientation correction greatly vary from operator to operator. Also, where the surface of a brittle material needs to be directly traced in order to position the material in parallel with a machining surface, there is a possibility that linear scars are left on the surface of the brittle material.

SUMMARY OF THE INVENTION

The present invention provides a machine tool which does not require a special device such as a displacement detector and yet permits the orientation of a workpiece or machining attachment to be easily and automatically corrected by rotating the workpiece or the machining attachment based on detection results provided by a position detector that the machine tool inherently has.

Also, the present invention provides a machine tool capable of detecting, through contact detection, a mounting error of a workpiece or machining attachment as an inclination thereof and making correction values for correcting the inclination automatically reflected in machining coordinate values of a machining program in cases where the number of rotary axes of a working machine to which the present invention is applied is not sufficient to correct the orientation of the workpiece or machining attachment.

A machine tool of the present invention is controlled by a numerical controller and has movable axes respectively supported by fluid bearings for moving a workpiece relative to a tool held by a machining attachment according to a machining program. The machine tool comprises: position detectors for respectively detecting positions of the movable axes; position deviation determining means that determines a position deviation between a position command for each of the movable axes and a position of each of the movable axes detected by the position detectors; contact detection means that detects a contact between a probe and a surface of the workpiece or the machining attachment when the position deviation detected by the position deviation determining means exceeds a preset value; movable axis stopping means that stops the movable axes at an instant when the contact is detected by the contact detection means; coordinate value detection means that obtains coordinate values at the instant when the contact is detected by the contact detection means; inclination determining means that moves linear axes of the movable axes so that the workpiece or the machining attachment is moved relative to the probe to perform detection of contacts between the probe and the surface of the workpiece or the machining attachment at least two different points on the surface by the contact detection means, and determines an inclination of the workpiece or the machining attachment based on a distance of motion of one of the linear axes and the coordinate values obtained by the coordinate value detection means; and correction means that corrects a mounting error of the workpiece or the machining attachment, or corrects the machining program based on the determined inclination of the workpiece or the machining attachment.

The movable axes may comprise linear axes and rotary axes, and the position detector for detecting the position of the linear axis may comprise a linear scale having a resolution of 10 nm or less.

The position detector for detecting the position of the rotary axis may comprise an encoder with a resolution of not greater than one ten-thousandth degree or less, and the rotary axis may be directly coupled to a motor to be driven directly thereby.

The surface of the workpiece may be a side surface including at least one flat face to be parallel or perpendicular to a direction of machining of the workpiece.

The machining attachment may comprise a rotary machining attachment, and the surface of the machining attachment may be a reference surface perpendicular to a rotary axis of a rotary tool of the rotary machining attachment.

The machining attachment may hold a cutting/scribing tool, and a side face of a shank of the cutting/scribing tool is used as the surface of the machining attachment.

The probe may be an elongate member made of metal to have a conical shape with a spherical end, and may be attached to a distal end of an arm of which orientation is changeable and provided on a magnet holder.

The workpiece and the machining attachment may be mounted on different rotary tables driven by respective rotary axes of the movable axes, the probe may be fixedly arranged on the rotary table on which the machining attachment is mounted when an mounting error of the workpiece is to be corrected, and the probe may fixedly arranged on the rotary table on which the workpiece is mounted when an mounting error of the machining attachment is to be corrected.

The correction means may automatically correct the mounting error of the workpiece or the machining attachment by rotating the rotary axis on which the workpiece or the machining attachment is mounted in an opposite direction by an angle of the determined inclination.

The correction means may automatically correct machining coordinate values of the machining program in accordance with the determined inclination.

According to the present invention, the orientation of the workpiece or the machining attachment can be easily and automatically corrected by rotating the workpiece or the machining attachment based on position command values specified by an NC program or detection results provided by the position detectors such as linear scales that the machine tool inherently has, without the need to use a special device such as a displacement detector.

Also, even in the case of a working machine of which the number of rotary axes is not sufficient to correct the orientation of the workpiece or the machining attachment, the present invention makes it possible to detect, through contact detection, a mounting error of the workpiece or the machining attachment as an inclination and to have correction values for correcting the inclination automatically reflected in machining coordinate values of a machining program.

BRIEF DESCRIPTION OF THE DRAWINGS

FIGS. 13a to 13c illustrate the manner of automatically correcting the mounting error of a workpiece;

DETAILED DESCRIPTION

Figure 1:
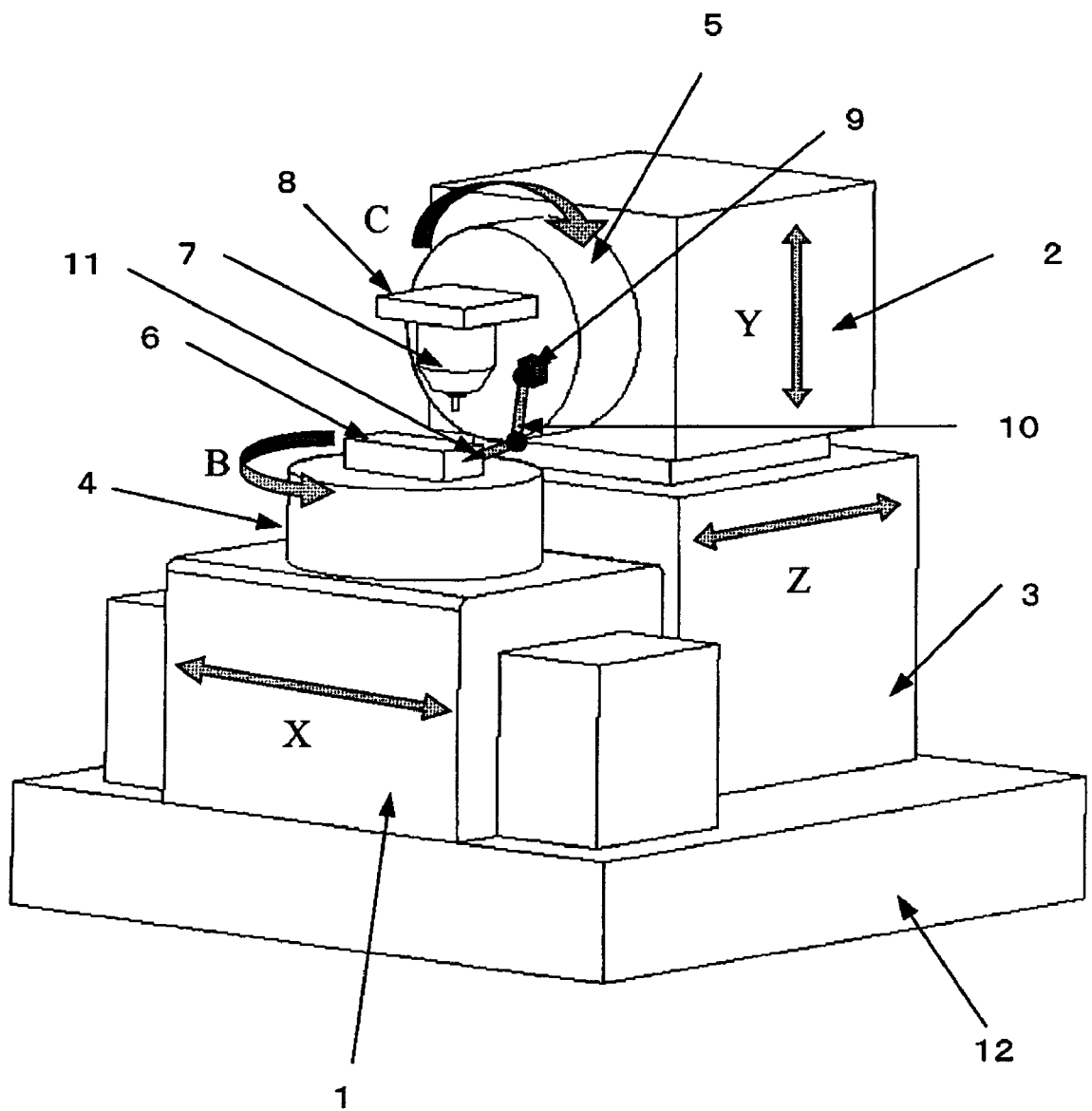
FIG. 1 is a perspective view of a principal part of a machine tool according to an embodiment of the present invention.
Figure 2:
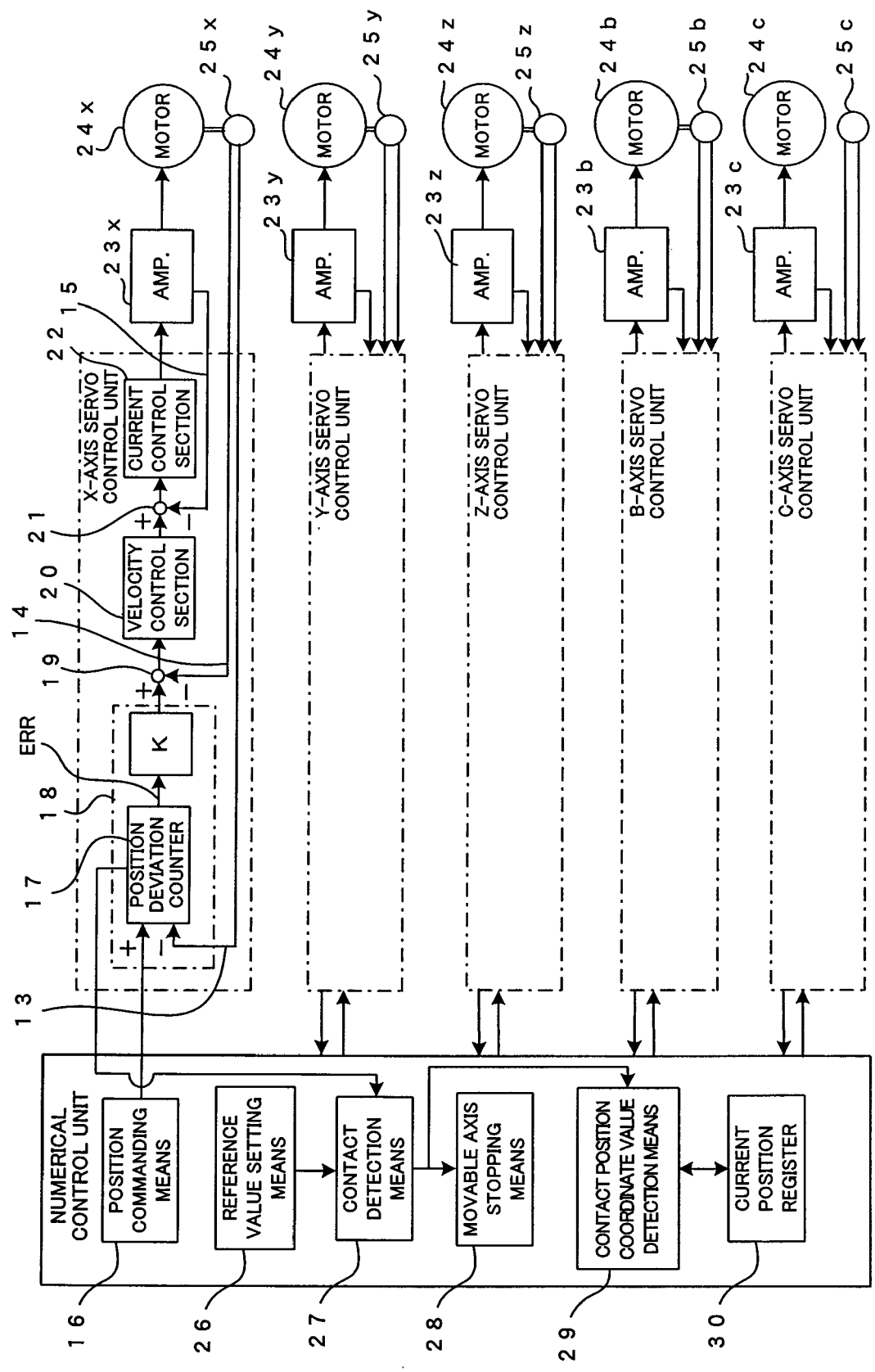
FIG. 2 is a block diagram showing a principal part of an exemplary numerical controller for the machine tool according to the embodiment of the present invention.

FIG. 1 is a perspective view of a principal part of a machine tool according to an embodiment of the present invention, which has a function of automatically correcting a mounting error through contact detection. The machine tool of this embodiment is a machine tool with five simultaneously controllable axes, namely, X, Y and Z axes, which are linear axes, and B and C axes, which are rotary axes. These movable axes are each supported by a fluid bearing, not shown, and thus are free from solid friction (mechanical friction). The rotary axes are directly coupled to respective motors to be directly driven thereby. As shown in FIG. 2, the linear X, Y and Z axes are associated with servomotors $24x$, $24y$ and $24z$, respectively, each comprising a linear motor, and movements of movable members driven by the respective servomotors $24x$, $24y$ and $24x$ are detected by position/velocity detectors $25x$, $25y$ and $25z$, respectively, each comprising a linear scale.

Specifically, the position detector for detecting the position of each linear axis comprises a linear scale with a resolution of 10 nm (nanometers) or less. Position/velocity detectors $25b$ and $25c$ associated with the rotary B and C axes, respectively, each comprise a high-performance encoder with a resolution of not greater than a 10000th of a degree.

X- and Z-axis tables 1 and 3 are mounted on a base 12. The Z-axis table 3 is driven in a horizontal direction perpendicular to the direction of the X axis. A Y-axis table 2 movable in the Y-axis direction perpendicular to both the X and Z axes is mounted on the Z-axis table 3. Rotary B- and C-axis tables 4 and 5 are mounted on the X- and Y-axis tables 1 and 2, respectively, such that their axes of rotation are directed perpendicularly to each other. The rotary B-axis table 4 rotates about the B axis perpendicular to the X axis, while the rotary C-axis table 5 rotates about the C axis perpendicular to the Y axis.

A workpiece 6 is placed on the rotary B-axis table 4, and a machining attachment 8 having a surface serving as a reference plane on which a spindle 7 is fixed is detachably mounted on the rotary C-axis table 5. Further, a magnet holder 9 is detachably attached to the rotary C-axis table 5. An arm 10 and a probe 11 coupled to each other by a universal joint are pivotally attached to the magnet holder 9. The probe 11 is made to contact with the machining attachment 8 or the workpiece 6. The magnet holder 9 may alternatively be attached to the rotary B-axis table 4.

The workpiece 6 and the machining attachment 8 are mounted on the respective different rotary axis tables of the machine tool, as stated above. When the orientation/mounting error of the workpiece 6 is to be automatically corrected, the magnet holder 9 is attached to the rotary table on which the machining attachment 8 is mounted, and when the orientation/mounting error of the machining attachment 8 is to be automatically corrected, the magnet holder 9 is attached to the rotary table on which the workpiece 6 is placed.

Figure 3:
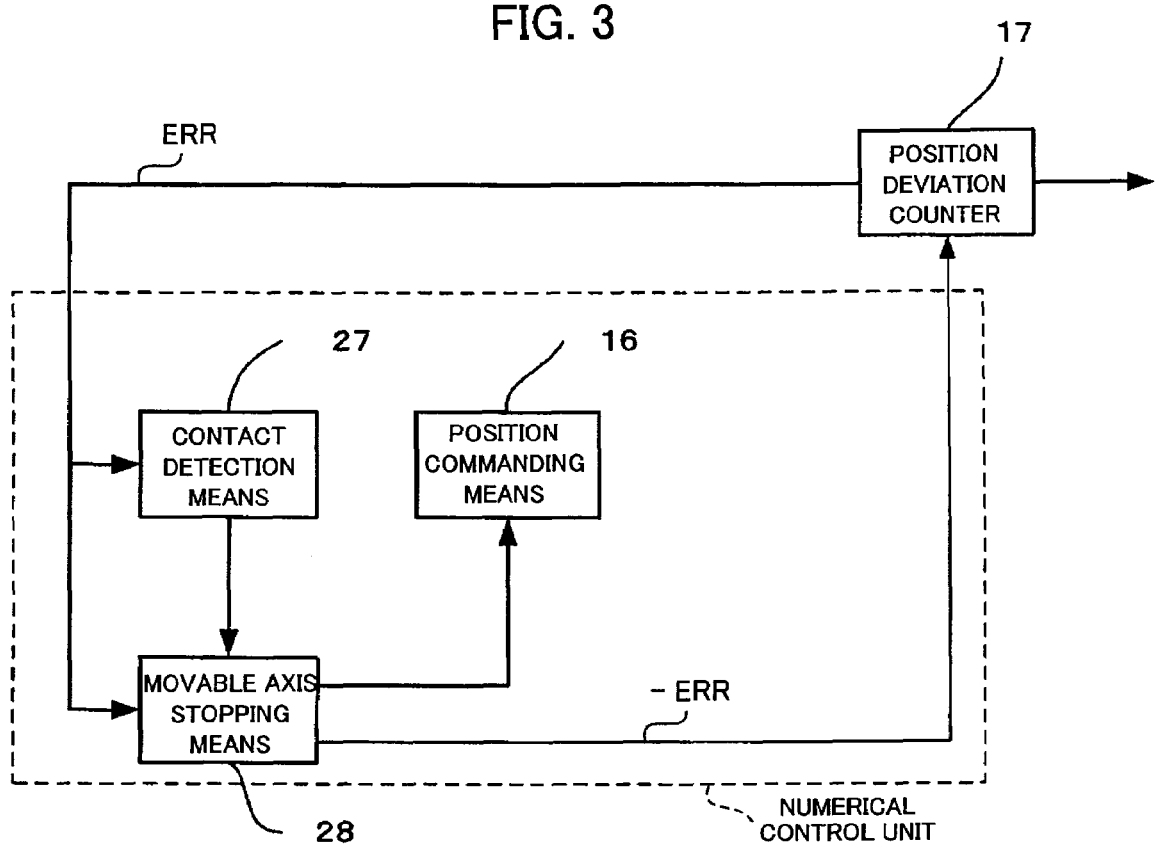
FIG. 3 is a block diagram also showing a principal part of the numerical controller of the machine tool according to the embodiment of the present invention.
Figure 4:
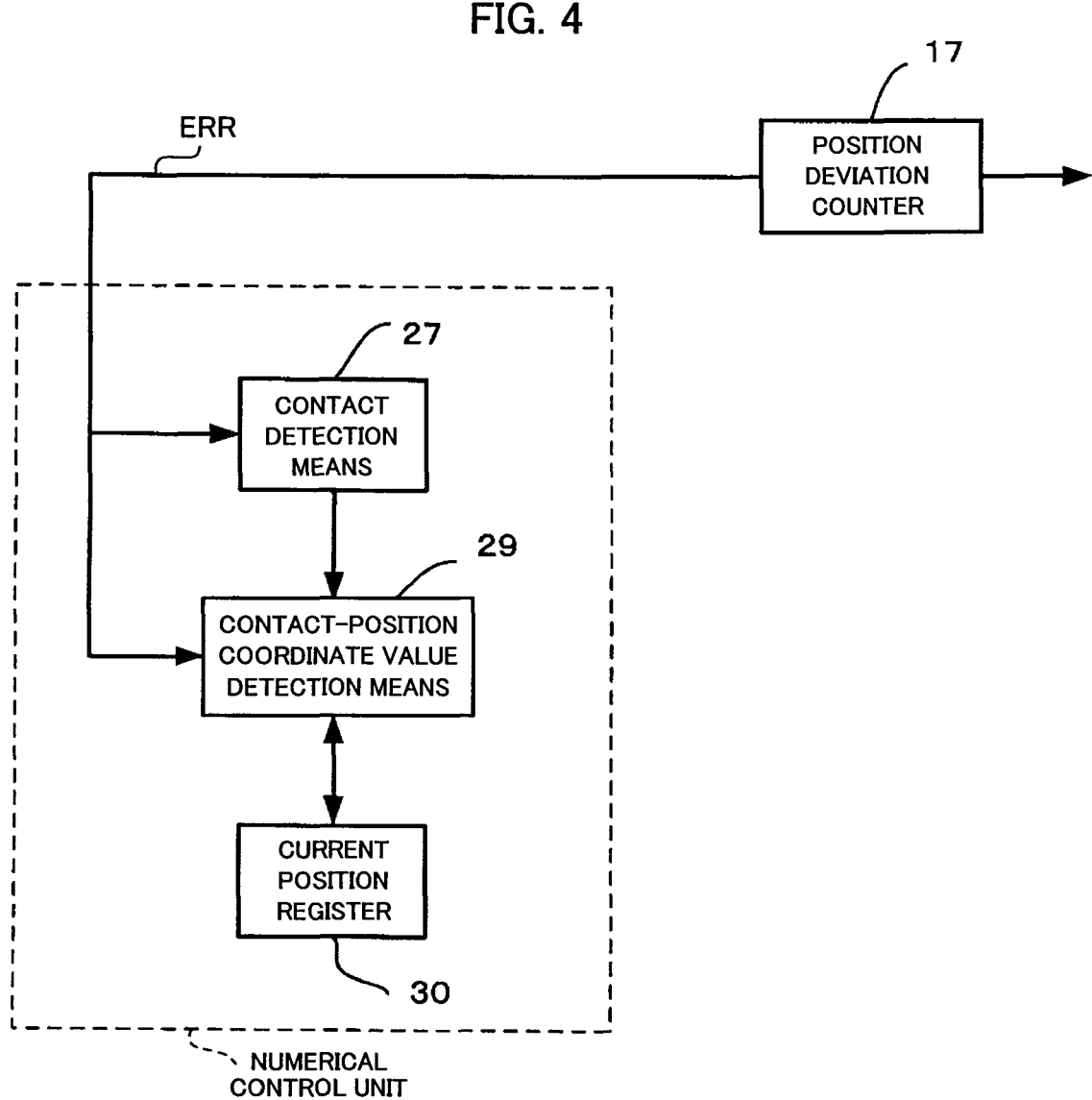
FIG. 4 is a block diagram showing a principal part of the numerical controller of the machine tool according to the embodiment of the present invention.

FIGS. 2 to 4 are block diagrams each showing a principal part of a numerical controller for controlling the machine tool of the present invention which is equipped with the function of automatically correcting mounting error through contact detection.

X-axis servo control unit performs position control, velocity control and current loop control on the servomotor $24x$ in accordance with a move command from a numerical control unit, specified by an NC program or the operator, to control the position and velocity of the servomotor 24x (i.e., the X axis which is a controlled axis driven by the servomotor 24x).

To control the servomotor 24x, position commanding means 16 of the numerical control unit carries out a move command distribution process to obtain a distributed move command MCMD for each predetermined distribution interval (move command output interval), and outputs the obtained move command MCMD to a position deviation counter 17 of the X-axis servo control unit. The position deviation counter 17 adds up the distributed move command MCMD and also subtracts, from the value held thereby, a value of a position feedback (position FB) 13 fed back from the position/velocity detector 25x for detecting the position and velocity of the servomotor 24x, to obtain a position deviation ERR. A position controller 18 multiplies the position deviation ERR by a position loop gain K to obtain a velocity command.

An adder/subtracter 19 subtracts, from the velocity command, a value of a velocity feedback (velocity FB) 14 fed back from the position/velocity detector 25x, to obtain a velocity deviation. A velocity control section 20 performs velocity loop control such as PI control (proportional-plus-integral control) to obtain a torque command (current command). An adder/subtracter 21 subtracts, from the torque command, a value of a current feedback (current FB) 15 fed back from a current detector associated with an amplifier 23x, to obtain a current deviation. A current control section 22 performs current loop control to control the operation of the servomotor 24x through the amplifier 23x. Position/velocity control similar to the aforementioned X-axis control is also performed on the Y and Z axes as well as on the rotary B and C axes.

The numerical control unit includes, as means for detecting contact between the workpiece 6 and the probe 11, contact detection means 27 input with the same position deviation ERR as that output from the position deviation counter 17 to the position controller 18, and position deviation reference value setting means 26 for setting reference values used as criteria for detecting the position deviation ERR that varies upon contact of the workpiece 6 with the probe 11. The contact detection means 27 compares the position deviation ERR input from the X-axis servo control unit with reference values B+ and B− set by the position deviation reference value setting means 26, to determine whether or not the position deviation ERR has varied beyond at least one of the reference values B+ and B−. If the position deviation ERR varies beyond at least one of the reference values B+ and B−, the contact detection means 27 outputs a signal to each of movable axis stopping means 28 and contact-position coordinate value detection means 29 in the numerical control unit.

Referring now to FIGS. 1 through 4, the means for detecting contact between the workpiece 6 and the probe 11 will be described. Machine tools are usually equipped with a skip function. The signal generated when the position deviation value calculated by the position deviation counter 17 is found to have varied beyond at least one of the reference values is utilized as a skip signal so that the move command may be skipped by the skip function to proceed to the subsequent process. The skip function includes: (1) instantly outputting a stop command from the numerical control unit to the servo control unit; (2) receiving the canceled position deviation value from the servo control unit and correcting the position information in the numerical control unit; (3) storing the current machine position as a skipped position in the storage of the numerical control unit; and (4) outputting pulses to the servo control unit so as to move the axis in a direction opposite to the direction in which the axis had been fed immediately before the output of the stop signal.

The probe 11 and the workpiece 6 can be made to contact with each other by decreasing the relative distance between the two to zero in accordance with the move command. In the following, therefore, an exemplary case will be explained wherein the X-axis table 1 shown in FIG. 1 is moved to bring the workpiece 6 into contact with the probe 11. Needless to say, the rotary C axis may alternatively be rotated to cause the probe 11 to contact with the workpiece 6.

To move the X-axis table so as to allow the workpiece 6 to contact with the probe 11, the X-axis servo control unit controls the servomotor 24x in accordance with the distributed move command MCMD from the position commanding means 16 such that the position deviation ERR, which is calculated by the position deviation counter 17 as a differential signal between the distributed move command MCMD and the position feedback (FB) signal from the position/velocity detector 25x, becomes "0" (zero).

At the instant the workpiece 6 comes into contact with the probe 11, the count value of the position deviation counter 17 changes because of the distributed move command MCMD supplied from the position commanding means 16 but the position feedback (FB) signal fails to follow the change, with the result that the position deviation ERR shows a sharp momentary change.

Figure 5A:
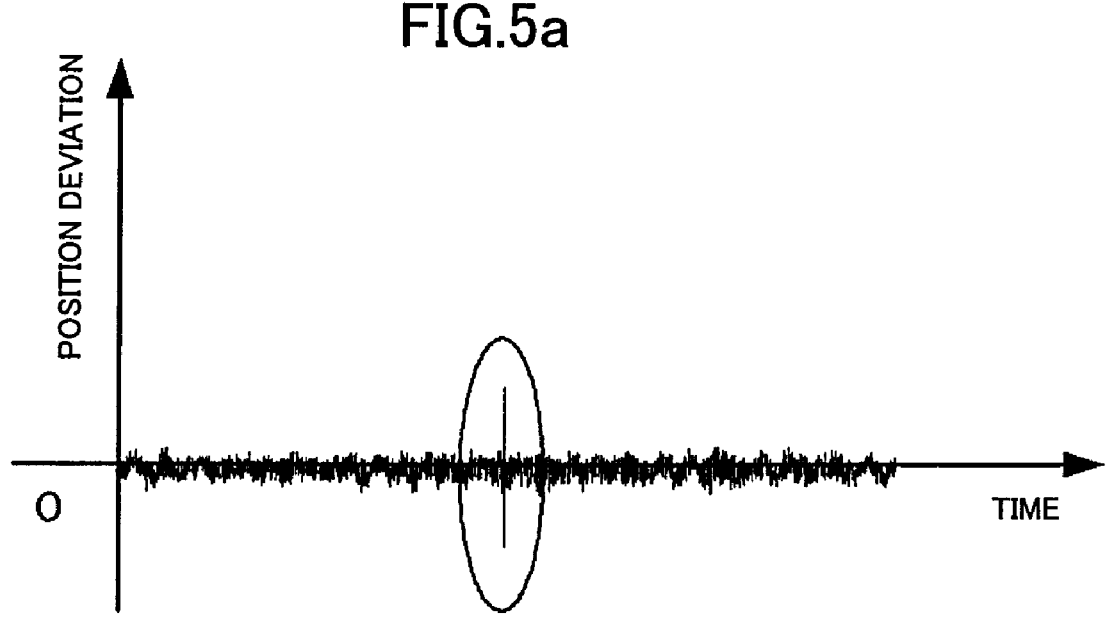
FIGS. 5a and 5b illustrate fluctuations in position deviation observed when a fluid bearing is used as a bearing for a movable axis.
Figure 5B:
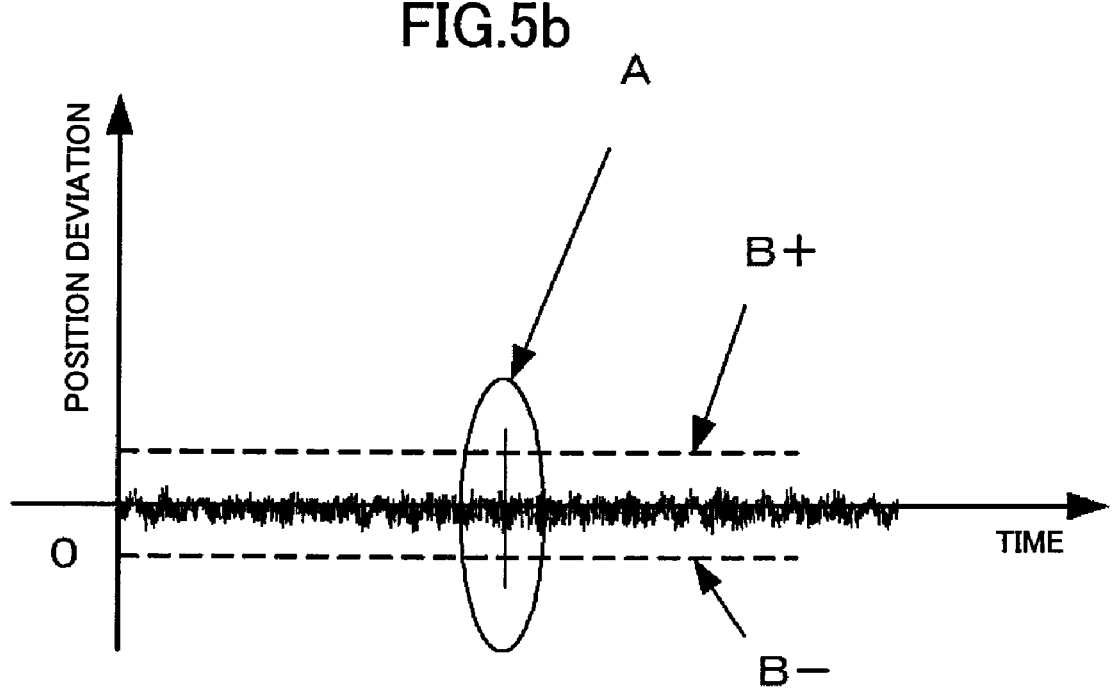

FIG. 5a exemplifies fluctuations in the position deviation ERR observed when a fluid bearing is employed as a bearing of a movable axis. Where a fluid bearing free from solid friction is used, the position deviation ERR remains stable as illustrated, and at the instant the workpiece 6 and the probe 11 shown in FIG. 1 contact with each other, the position deviation ERR suddenly changes. By detecting such a sudden change in the position deviation ERR, it is possible to make a judgment that the workpiece 6 and the probe 11 have contacted with each other. For example, the reference values B+ and B− are set as shown in FIG. 5b, and at point A where the position deviation ERR suddenly changes beyond the reference value B+ or B−, a judgment may be made that the workpiece 6 and the probe 11 have contacted with each other. The workpiece 6 and the probe 11 may be judged to have contacted with each other when the position deviation ERR varies beyond at least one of the reference values B+ and B−. The reference values B+ and B− can be optionally set by the position deviation reference value setting means 26 shown in FIG. 2.

The following describes a process for stopping the X axis when contact between the workpiece 6 and the probe 11 is detected. FIG. 3 illustrates the manner of how the X axis as a movable axis is stopped on detection of contact between the workpiece 6 and the probe 11 in accordance with the embodiment. On detecting contact between the workpiece 6 and the probe 11, the contact detection means 27 outputs a contact detection signal to the movable axis stopping means 28. The movable axis stopping means 28 outputs a command signal to the position commanding means 16 to instruct same to stop outputting the distributed move command MCMD. At the same time, the movable axis stopping means 28 outputs the negative of the position deviation ERR (i.e., −ERR) to the position deviation counter 17 so that the position deviation value remaining in the position deviation counter 17 may be offset and become zero ("0"). As a result, the count value of the position deviation counter 17 becomes zero ("0") and the X axis stops.

A process for obtaining the coordinate value of the X axis on detection of contact between the workpiece 6 and the probe 11 will be now described. FIG. 4 illustrates the manner of how the X-axis coordinate value is detected by the coordinate value detection means on detection of contact between the workpiece 6 and the probe 11 in accordance with the embodiment. The numerical control unit is provided with a current position register 30 for storing the current position of the servomotor 24x (movable X axis). The current position register 30 holds data on the current position of the X-axis table by accumulating the distributed pulses output from the position commanding means 16 to the position deviation counter 17. The contact-position coordinate value detection means 29 fetches the value stored in the current position register 30 and then corrects the current position by subtracting the position deviation value ERR from the fetched value, to obtain the coordinate value of the position of contact between the workpiece 6 and the probe 11.

The contact-position coordinate value detection means 29 may alternatively be configured as follows. The position FB signal from the position/velocity detector 25x is stored in the current position register 30 and is accumulated until contact between the workpiece 6 and the probe 11 is detected by the contact detection means 27, to obtain the current position.

Also, instead of using the position deviation value of the X axis as a movable axis, the position deviation value of the rotary B axis, which also is a movable axis, may be utilized to detect contact between the workpiece and the probe on the basis of change in the position deviation value. In the machine tool of this embodiment, the linear X-, Y- and Z-axis tables 1, 2 and 3 and the rotary B- and C-axis tables 4 and 5 are each supported by a fluid bearing and thus are acted upon by almost no friction. Accordingly, when the probe 11 and the workpiece 6 come into contact with each other and are applied with a load, any of the movable axes moves due to the applied load. Since the position deviation ERR between the commanded position and the detected position increases because of the movement of the axis, contact between the probe 11 and the workpiece 6 can be detected by detecting such an increase in the position deviation ERR.

For example, when the workpiece 6 is brought into contact with the probe 11 by moving the X-axis table, torque acts upon the rotary B axis to rotate the rotary B-axis table, so that the position deviation value of the rotary B axis momentarily increases. Needless to say, the workpiece has to come into contact with the probe in such a direction as to apply a rotating force to the rotary table in order that the contact between the two may be detected from a momentary change in the position deviation value of the rotary axis.

In the above description, the workpiece 6 and the probe 11 are made to contact with each other. Alternatively, the probe 11, which is, in FIG. 1, removably attached to the rotary C-axis table 5 by the magnet holder 9, may be placed on the rotary B-axis table and may be caused to contact with a reference plane 8a of the machining attachment 8, in place of the workpiece 6.

While the X axis has been explained above with reference to FIG. 2, the Y, Z, B and C axes also are configured in like manner. The contact detection according to the present invention may be performed either with respect to all of the movable axes constituting the machine tool, or with respect to only a particular axis such as the X or Y axis only.

Figure 6:
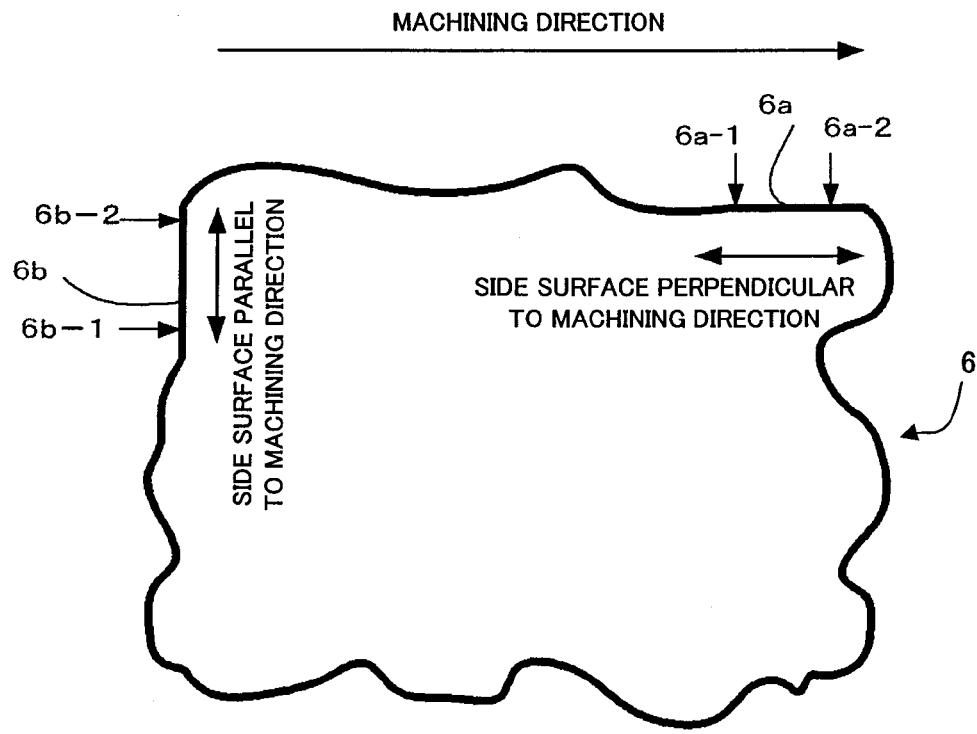
FIG. 6 exemplifies a workpiece to be machined.

FIG. 6 exemplifies the workpiece 6 to be machined by the machine tool of the present invention. The workpiece 6 has a side surface 6a parallel to a machining direction or a side surface 6b perpendicular to the machining direction, as a reference plane by means of which data necessary to automatically correct a mounting error of the workpiece 6 is collected.

When the probe 11 is allowed to contact with the workpiece 6 for the automatic correction of the mounting error of the workpiece 6, the side surface 6a parallel to the machining direction or the side surface 6b perpendicular to the machining direction is selected as a location for the contact detection, and the probe 11 is made to contact with at least two different points on the same side surface. For the side surface 6a parallel to the machining direction, for example, points 6a-1 and 6a-2 may be selected, and for the side surface 6b perpendicular to the machining direction, points 6b-1 and 6b-2 may be selected. Subsequently, an inclination of the workpiece 6 is obtained from the distance of movement of the linear axis between the two different points and the coordinate values calculated by the contact-position coordinate value detection means 29 (cf. FIGS. 2 and 4). Then, based on the obtained inclination of the workpiece 6, the mounting error of the workpiece 6 is corrected or the coordinate system of a machining program is corrected (cf. FIGS. 13a to 18).

Figure 7:
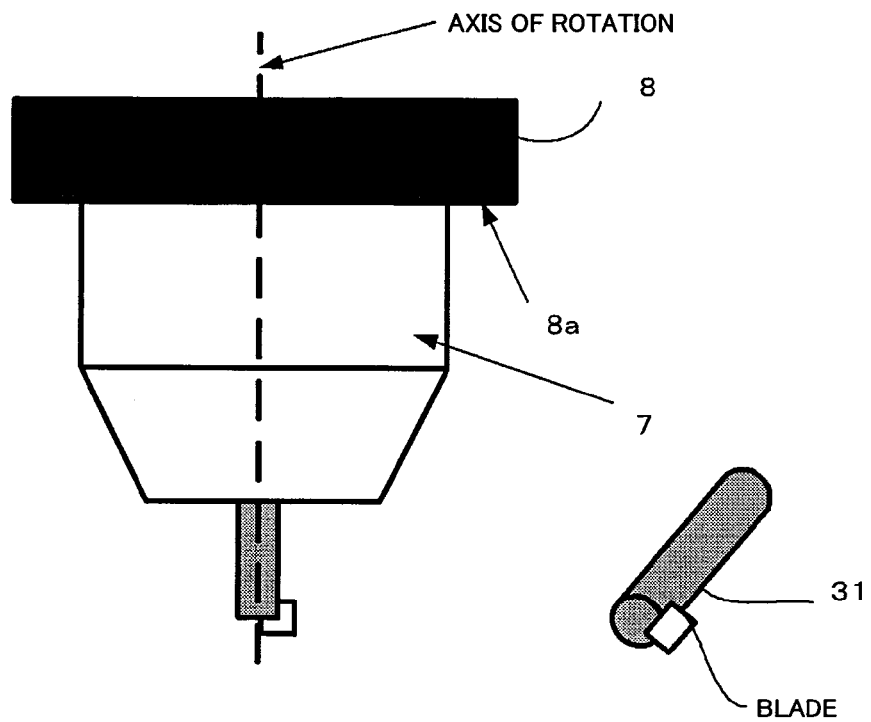
FIG. 7 shows a cutting spindle fixed on a machining attachment.

FIG. 7 illustrates the reference plane 8a of the machining attachment 8 which is mounted on the rotary C-axis table 5 as shown in FIG. 1 and to which the spindle 7 is fixed. As illustrated, the spindle 7 for rotating a rotary cutting tool 31 is attached to the reference plane 8a. The reference plane 8a is perpendicular to the axis of rotation of the rotating tool 31.

Figure 8:
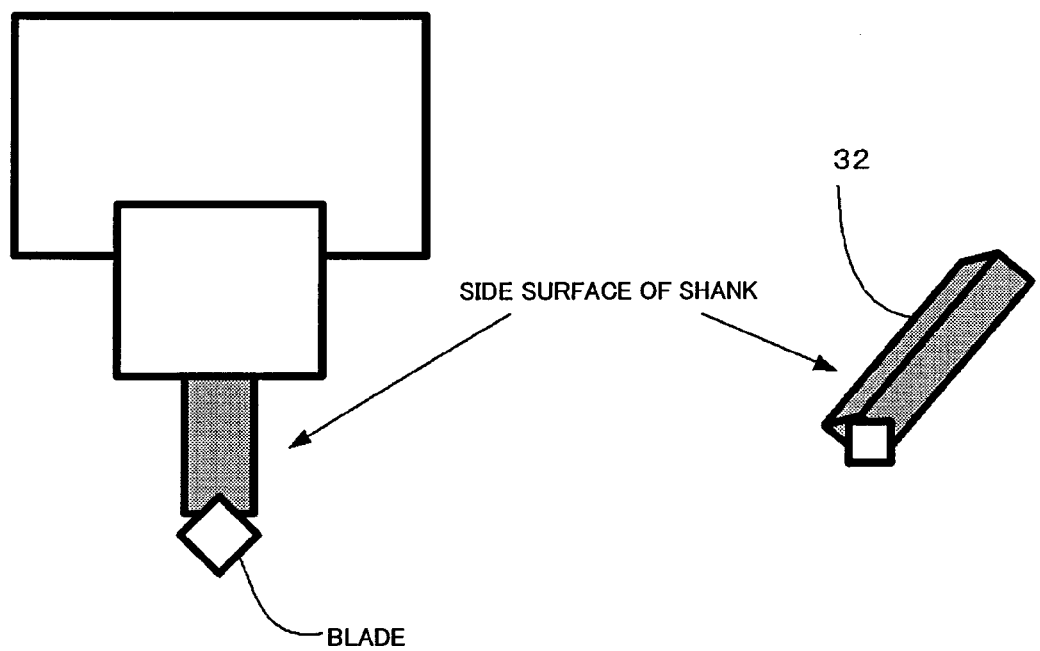
FIG. 8 shows a side surface of a shank of a cutting/scribing tool.

FIG. 8 exemplifies a cutting/scribing tool 32 as a machining tool attached to the rotary C-axis table 5 shown in FIG. 1. The cutting/scribing tool 32 is mounted in a specified orientation, and since the shank of the tool 32 has a flat side surface, the flat side surface can be used as the reference plane.

Figure 9:
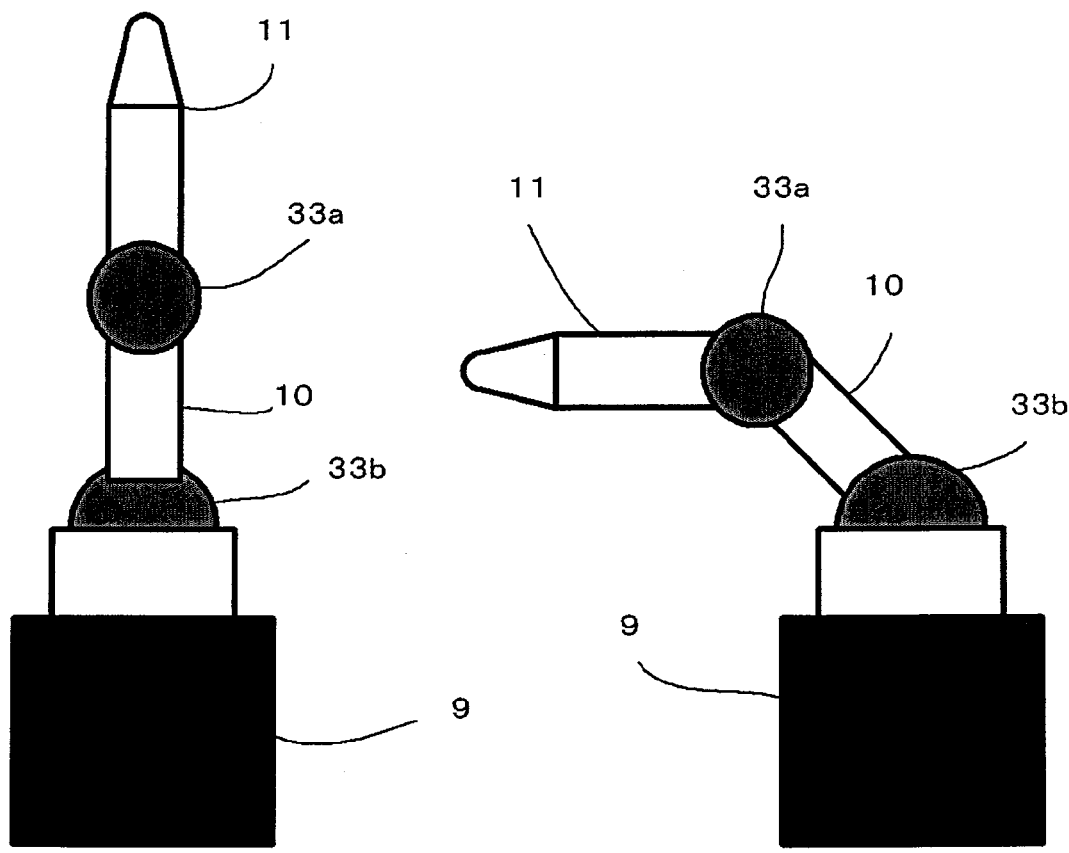
FIG. 9 exemplifies a probe attached to a distal end of a magnet holder with an arm whose orientation is freely changeable.

FIG. 9 exemplifies the probe 11 which is, in FIG. 1, attached to the rotary C-axis table 5. A universal joint 33b is fixed to the magnet holder 9, and the arm 10 is pivotally attached to the universal joint 33b so that the orientation of the arm 10 may be freely adjustable. The probe 11 is pivotally attached through a universal joint 33a to the distal end of the arm 10. The probe 11 is an elongate member of metal shaped like a cone or the like with a spherical tip.

Figure 10:
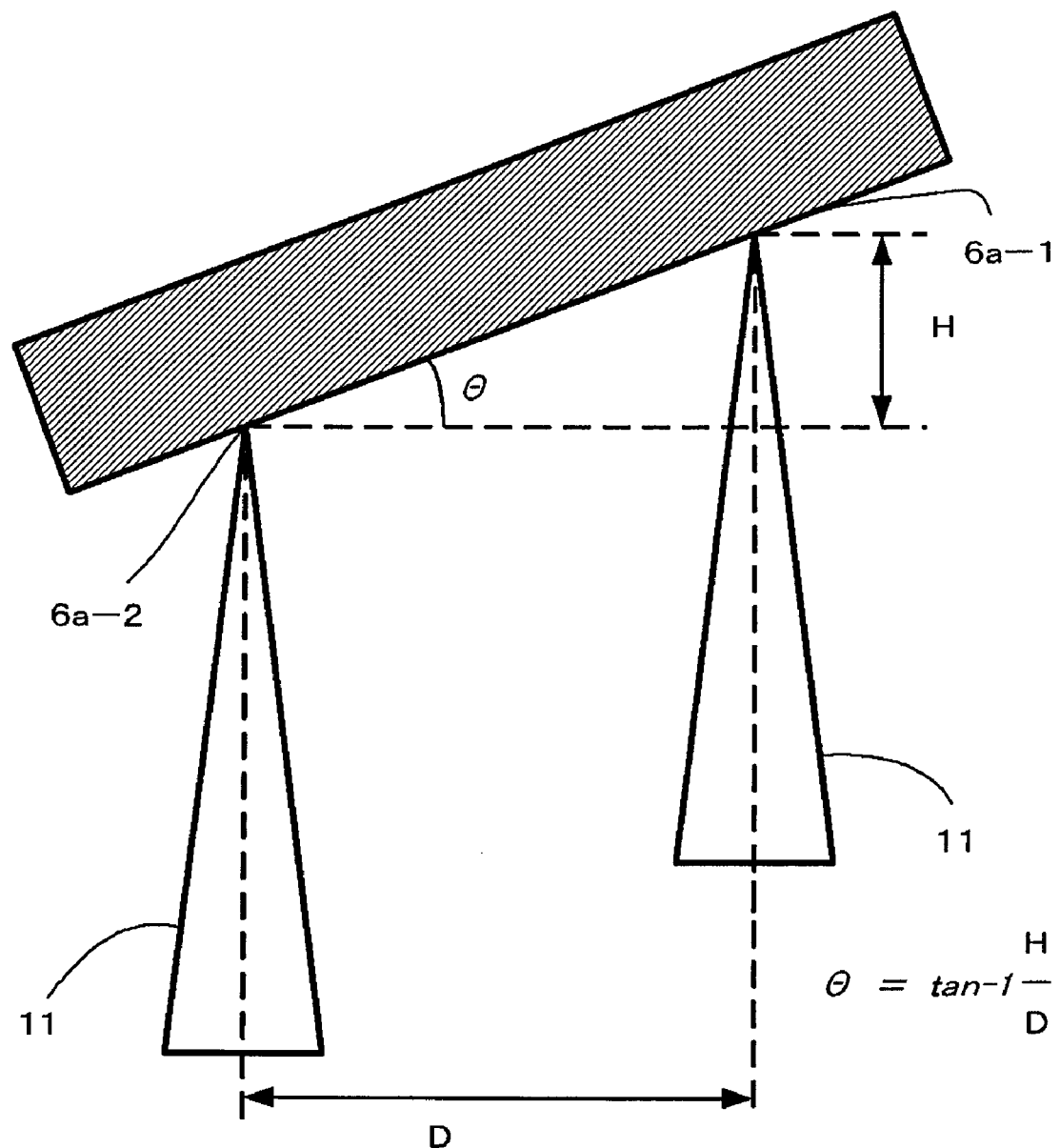
FIG. 10 illustrates a theory in accordance with which a displacement angle θ of a workpiece or of a reference plane of a machining attachment is obtained from a difference H between contact position coordinate values of the probe and a distance D of translational movement of the probe.

FIG. 10 illustrates a theory in accordance with which a displacement angle θ of the workpiece 6 or of the reference plane 8a of the machining attachment 8 is obtained from a difference H between contact position coordinate values of the probe 11 and a distance D of translational movement of the probe 11. The theory illustrated in FIG. 10 will be applied to the case of obtaining the inclination of the workpiece 6 explained above with reference to FIG. 6. To make the probe 11 contact with the workpiece 6, the side surface 6a parallel to the machining direction is selected as a surface with which the probe 11 is brought into contact. Then, the contact position coordinate value at each of the points 6a-1 and 6a-2 is obtained, and the difference H between the contact position coordinate values at the respective two points is calculated. Also, the distance D of translational movement of the linear axis between the points 6a-1 and 6a-2 is obtained. Thereupon, the displacement angle θ of the workpiece 6 can be obtained according to the equation shown in FIG. 10. The inclination of the machining attachment 8 can also be obtained from the difference between the contact position coordinate values at two different points on the reference plane 8a and the distance of the translational movement, as in the case of obtaining the inclination of the workpiece 6. In accordance with the theory illustrated in FIG. 10, at least two contact position coordinate values obtained at respective two different points are needed to obtain the inclination. Alternatively, the contact position coordinate value may be obtained at three or more points so that a plurality of displacement angles may be calculated, and an average value of the calculated angles may be employed as the displacement angle of the workpiece 6.

Figure 11:
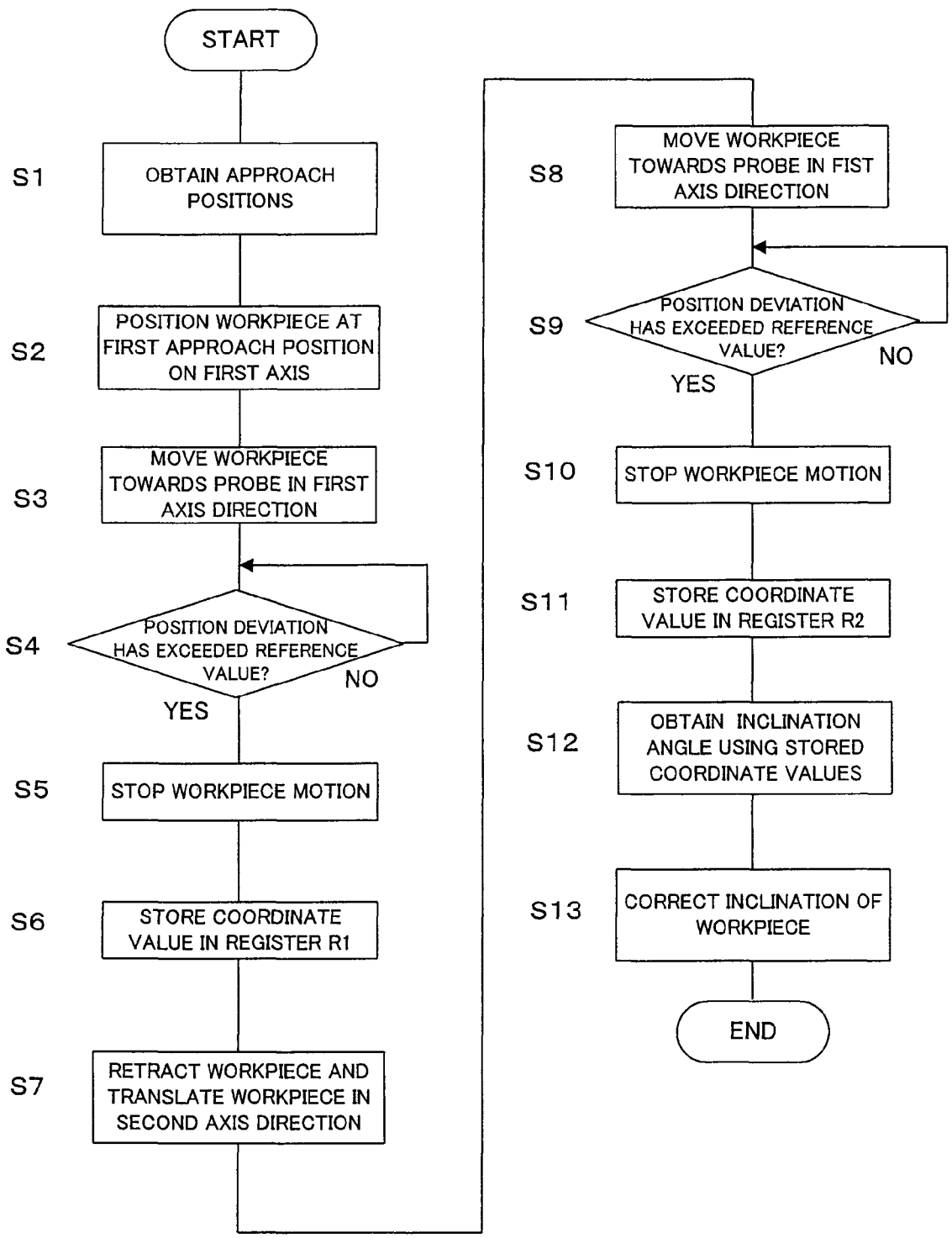
FIG. 11 is a flowchart illustrating a processing algorithm for measuring the inclination of a workpiece according to the embodiment.

A processing algorithm for measuring the inclination of a workpiece according to the embodiment will be now described with reference to the flowchart of FIG. 11.

After a workpiece is placed on a table coupled to a predetermined movable axis, the process for correcting the inclination of the workpiece is started. First, measurement approach positions for the workpiece are obtained (Step S1). The measurement approach positions may be obtained from a machining program or be manually set by the operator. After the measurement approach positions are set in Step S1, the workpiece is positioned at a first measurement approach position on a first axis (Step S2). Then, the workpiece is moved towards the probe in the direction of a first axis (Step S3), and a determination is continuously made as to whether or not the position deviation has exceeded at least one of the reference values (Step S4). If neither of the reference values is exceeded, the workpiece is continuously moved toward the probe. If the position deviation is judged to have varied beyond at least one of the reference values, the motion of the workpiece is stopped (Step S5) and the coordinate value at the stopped position is stored in a register R1 (Step S6). Subsequently, to allow the workpiece to be translated to a second measurement approach position, the workpiece is retracted and moved in the direction of a second axis perpendicular to the first axis (Step S7). The workpiece is then moved toward the probe (Step S8), and a determination is continuously made as to whether or not the position deviation has exceeded at least one of the reference values (Step S9). If neither of the reference values is exceeded, the workpiece is continuously moved toward the probe. If the position deviation is judged to have varied beyond at least one of the reference values, the workpiece is stopped (Step S10) and the coordinate value at the stopped position is stored in a register R2 (Step S11). Then, using the coordinate values stored in the registers R1 and R2, the displacement angle θ is obtained according to the equation shown in FIG. 10 (Step S12). The inclination of the workpiece is corrected in accordance with the obtained displacement angle (Step S13), whereupon the process ends.

Figure 12:
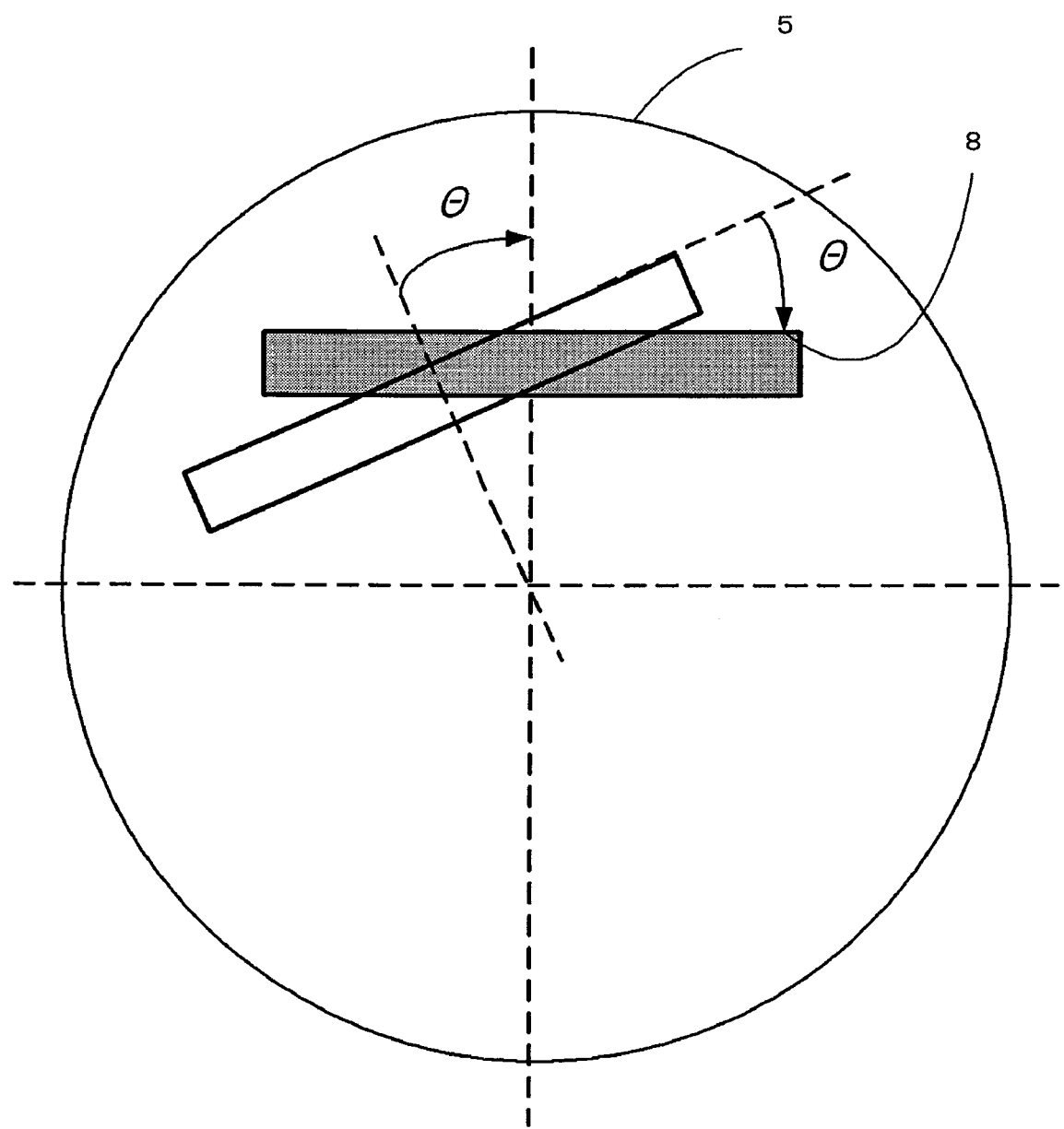
FIG. 12 illustrates the manner of correcting the orientation by rotating a rotary axis in an opposite direction by the displacement angle θ.

FIG. 12 illustrates the manner of correcting the orientation of the machining attachment 8 by rotating the rotary C axis in an opposite direction by the displacement angle θ of the reference plane 8a. Correction means for automatically correcting a mounting error of the workpiece 6 or the machining attachment 8 rotates the corresponding rotary axis in a direction opposite to that in which the workpiece 6 or the machining attachment 8 is displaced, by an angle equal to the obtained displacement angle, thereby automatically correcting the mounting error of the workpiece 6 or the machining attachment 8.

FIGS. 13a-13c illustrate the manner of automatically correcting a mounting error of the workpiece 6. An inclination of the workpiece 6 is obtained according to the theory explained above with reference to FIG. 10. Specifically, the workpiece 6 is placed on the rotary B-axis table 4 as shown in FIG. 13a, and the probe 11 is allowed to contact with a side surface of the workpiece 6. Then, as shown in FIG. 13b, the probe 11 is relatively shifted in the Z-axis direction and is again allowed to contact with the side surface of the workpiece 6 to detect the contact position. Based on the detection results obtained using the probe as shown in FIGS. 13a and 13b, the displacement angle of the workpiece 6 is derived, and the rotary table is rotated by an angle corresponding to the displacement angle such that the workpiece is positioned with its side surfaces directed parallel with the X and Z axes, as shown in FIG. 13c, thereby correcting the mounting error of the workpiece. Two points on an identical surface of the workpiece 6 are selected as the contact positions.

Figure 14A:
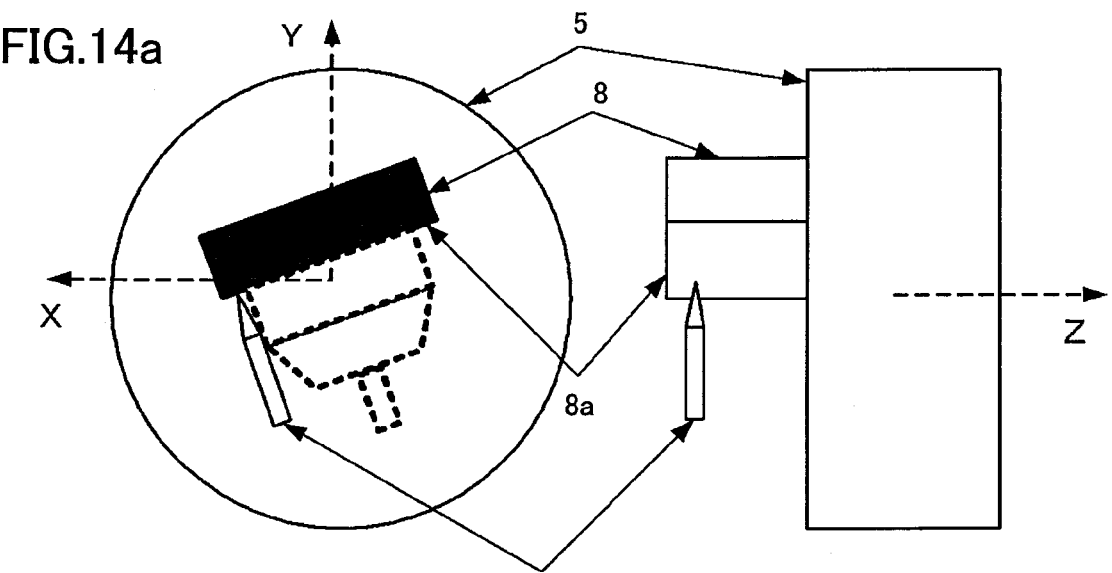
FIGS. 14a to 14c illustrate the manner of automatically correcting the mounting error of the machining attachment.
Figure 14B:
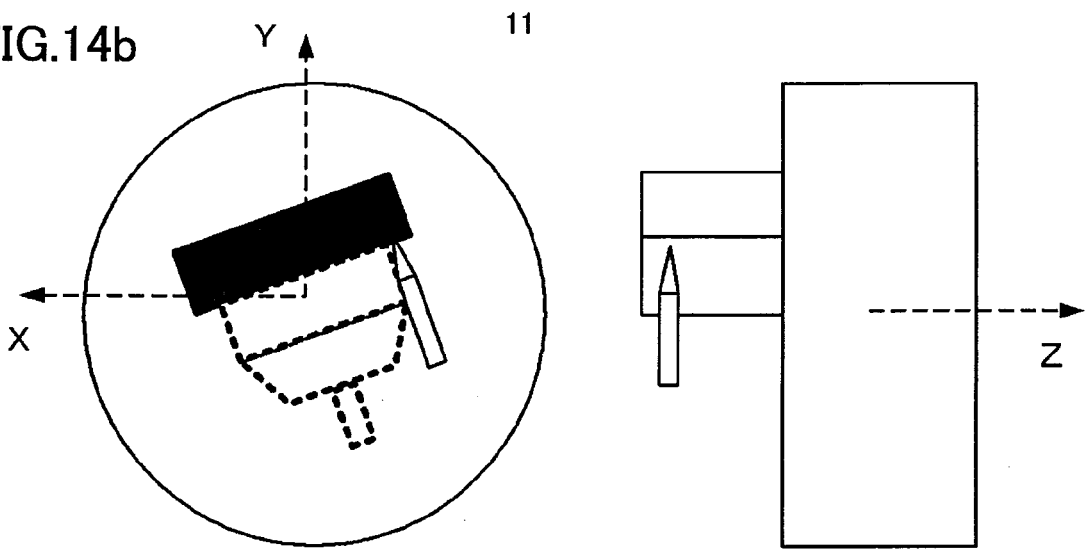
Figure 14C:
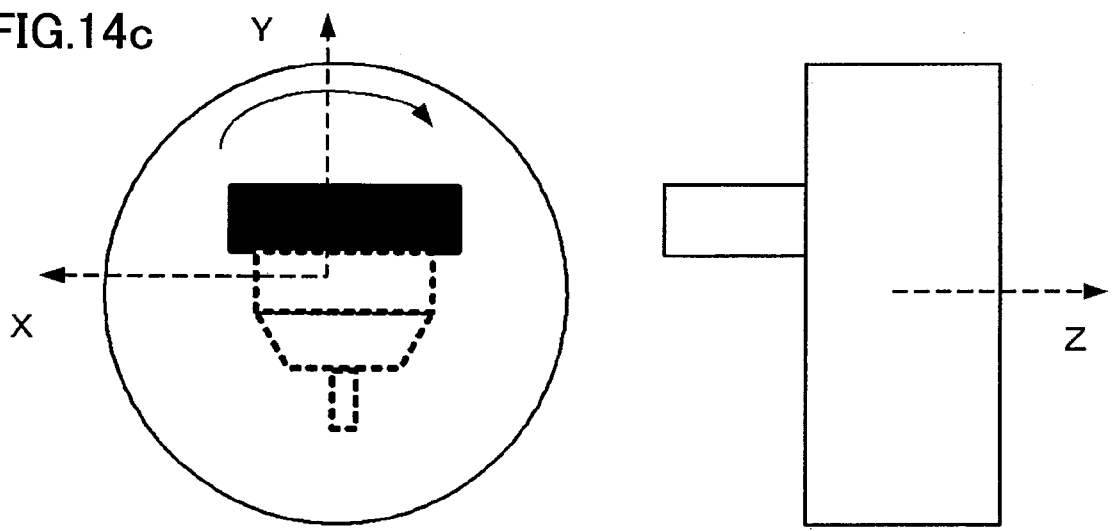

FIGS. 14a-14c illustrate the manner of automatically correcting a mounting error of the machining attachment 8. An inclination of the machining attachment 8 is obtained according to the theory explained above with reference to FIG. 10. Specifically, the probe 11 is allowed to contact with the reference plane 8a of the machining attachment 8, as shown in FIG. 14a, to detect the contact position. Then, as shown in FIG. 14b, the probe 11 is relatively shifted in the X-axis direction and is again allowed to contact with the reference plane 8a of the machining attachment 8 to detect the contact position. In accordance with the detection results obtained using the probe as shown in FIGS. 14a and 14b, the rotary C-axis table 5 is rotated by an angle corresponding to the displacement angle of the reference plane 8a, as shown in FIG. 14c, to correct the mounting error of the reference plane 8a of the machining attachment 8.

Figure 15:
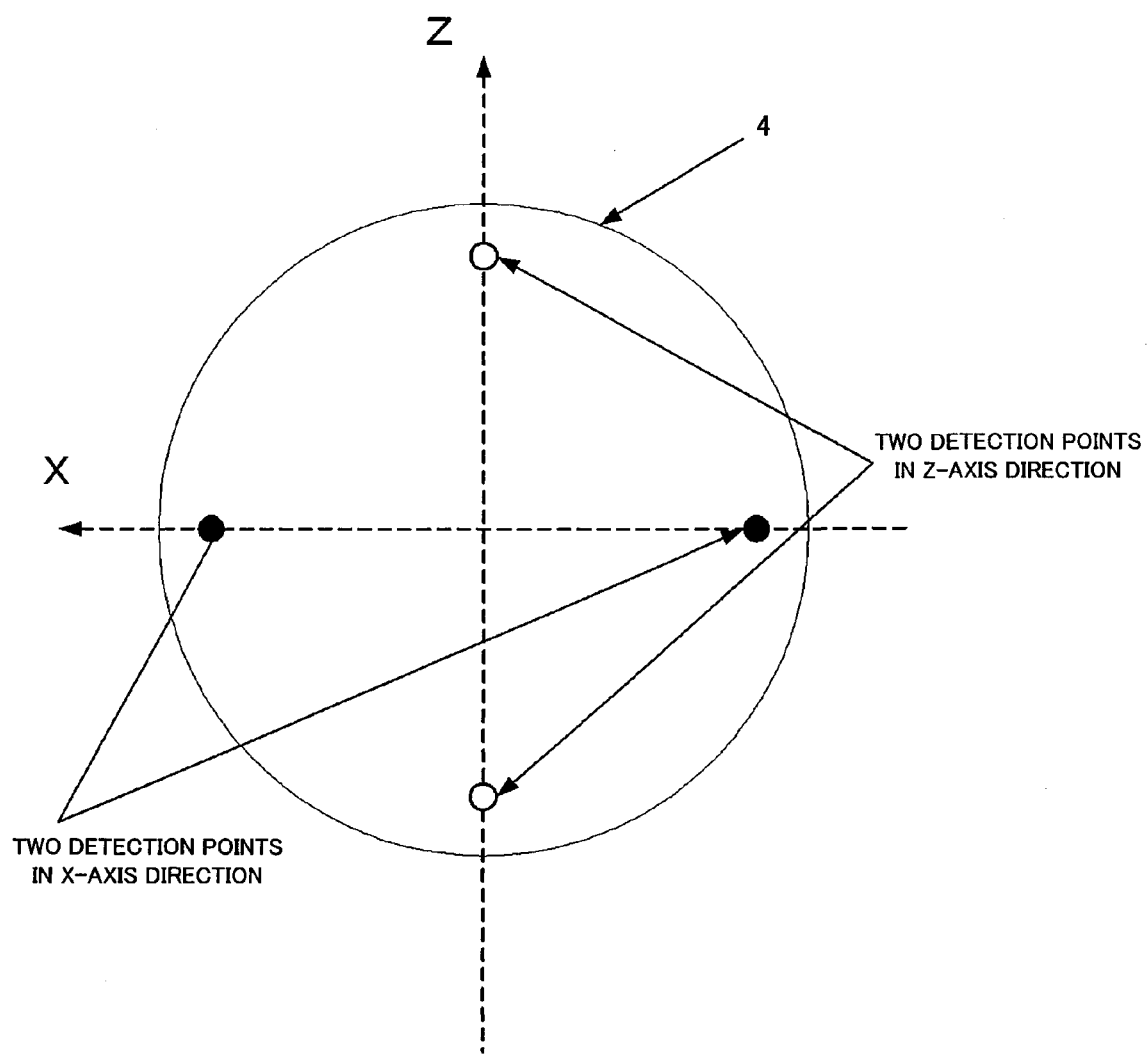
FIG. 15 exemplifies contact detection points where the probe is allowed to contact with a workpiece in cases where the mounting position of the machining attachment relative to a machining surface of the workpiece is to be corrected.

FIG. 15 exemplifies contact detection points where the probe 11 is allowed to contact with a workpiece in cases where the mounting position of the machining attachment 8 relative to a machining surface of the workpiece 6 is to be corrected. As shown in FIG. 15, two points aligned in the X- or Z-axis direction are set, as the contact detection points, on the upper surface of the workpiece 6 placed on the rotary B-axis table 4.

Figure 16A:
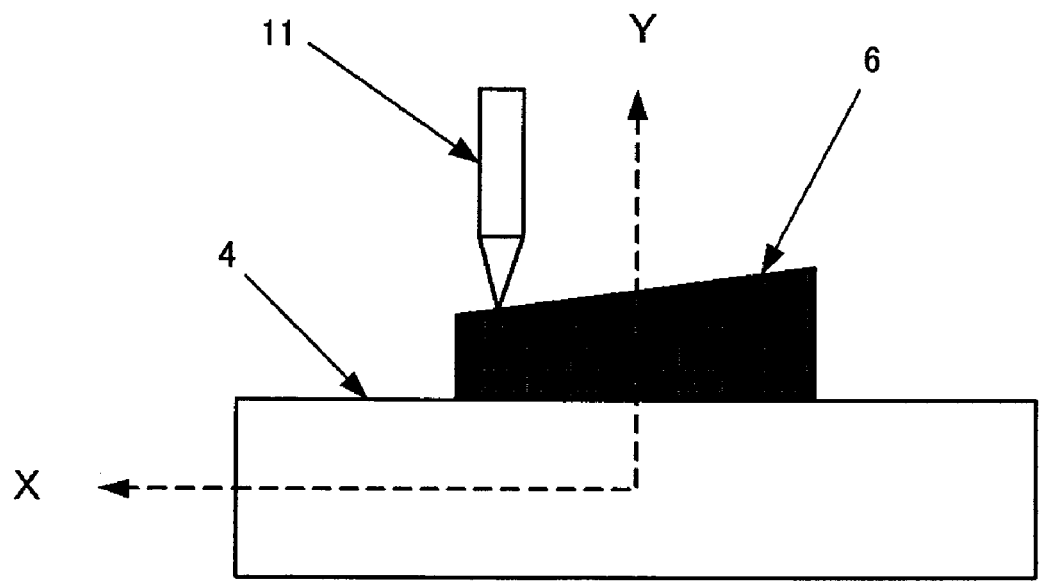
FIGS. 16a and 16b illustrate the manner of how the probe is allowed to contact with the machining surface of the workpiece in the case where the tool is fed in the X-axis direction.
Figure 16B:
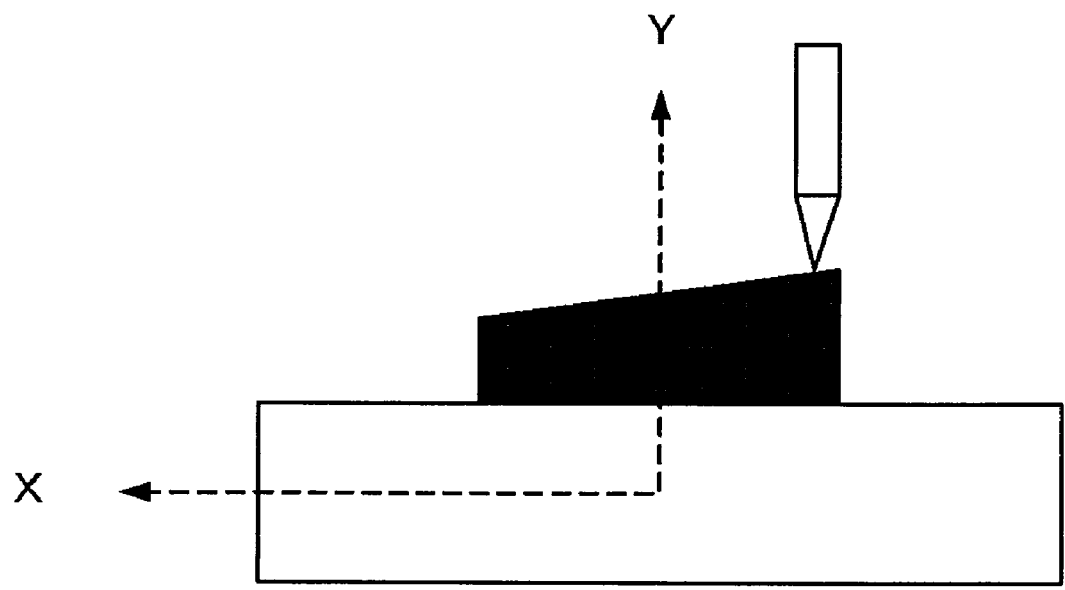

FIGS. 16a and 16b illustrate the manner of how the probe is allowed to contact with the machining surface of the workpiece 6 in the case where the tool is fed in the X-axis direction, as shown in FIG. 15. First, the probe 11 is allowed to contact with a point on the machining surface shown in FIG. 16a, and then again allowed to contact with another point on the machining surface shown in FIG. 16b, to detect respective contact positions.

Figure 17A:
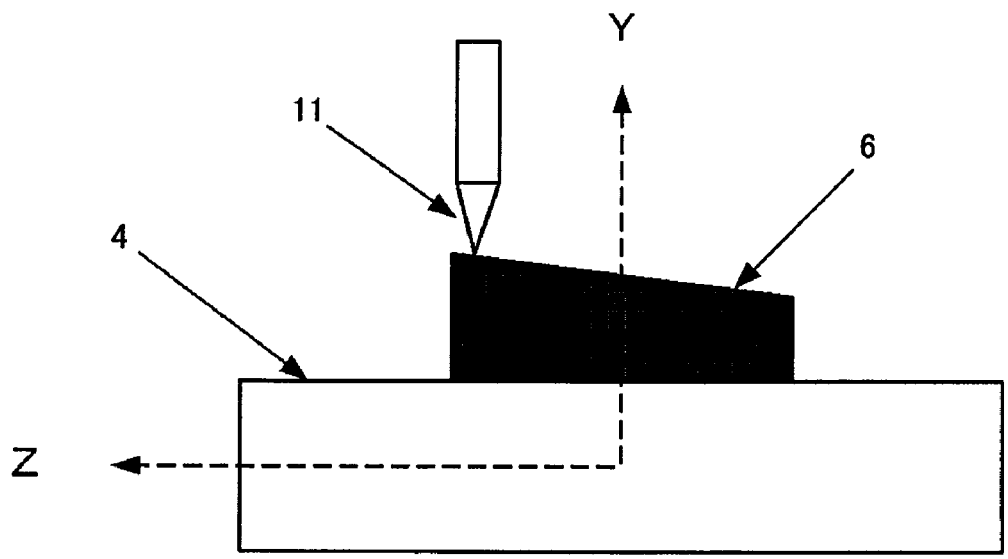
FIGS. 17a and 17b illustrate the manner of how the probe is allowed to contact with the machining surface of the workpiece in the case where the tool is fed in the Z-axis direction.
Figure 17B:
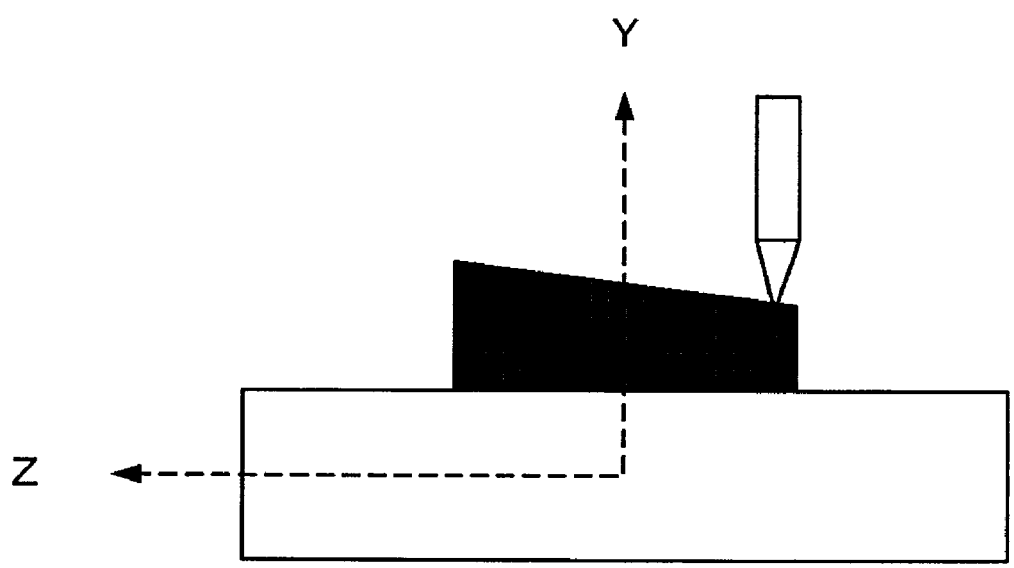

FIGS. 17a and 17b illustrate the manner of how the probe is allowed to contact with the machining surface of the workpiece 6 in the case where the tool is fed in the Z-axis direction, as shown in FIG. 15. First, the probe 11 is allowed to contact with a point on the machining surface shown in FIG. 17a, and then again allowed to contact with another point on the machining surface shown in FIG. 17b, to detect respective contact positions.

Figure 18:
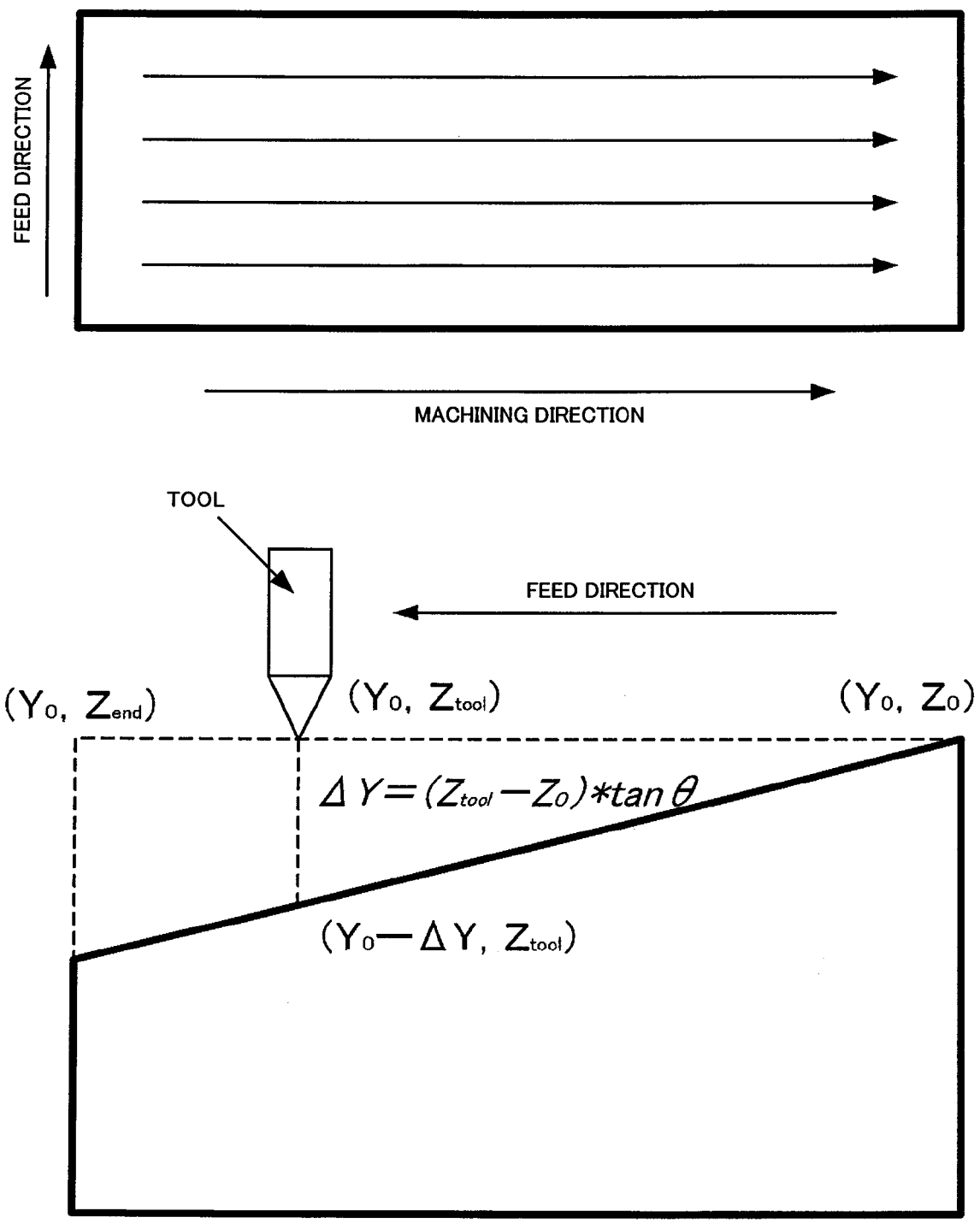
FIG. 18 illustrates the manner of how machining coordinate values are corrected during scribing at a fixed feed pitch in cases where the arrangement of the axes does not permit the orientation to be corrected by means of a rotary axis.

FIG. 18 illustrates the manner of how machining coordinate values are corrected during scribing at a fixed feed pitch in cases where the arrangement of the axes does not permit the orientation to be corrected by means of a rotary axis.

What is claimed is:

1. A machine tool controlled by a numerical controller and having movable axes respectively supported by fluid bearings for moving a workpiece relative to a tool held by a machining attachment according to a machining program, comprising:

position detectors for respectively detecting positions of the movable axes;

position deviation determining means that determines a position deviation between a position command for each of the movable axes and a position of each of the movable axes detected by said position detectors;

contact detection means that detects a contact between a probe and a surface of the workpiece or the machining attachment when the position deviation detected by said position deviation determining means exceeds a preset value;

movable axis stopping means that stops the movable axes at an instant when the contact is detected by said contact detection means;

coordinate value detection means that obtains coordinate values at the instant when the contact is detected by said contact detection means;

inclination determining means that moves linear axes of the movable axes so that the workpiece or the machining attachment is moved relative to the probe to perform detection of contacts between the probe and the surface of the workpiece or the machining attachment at least two different points on the surface by said contact detection means, and determines an inclination of the workpiece or the machining attachment based on a distance of motion of one of the linear axes and the coordinate values obtained by said coordinate value detection means; and correction means that corrects a mounting error of the workpiece or the machining attachment, or corrects the machining program based on the determined inclination of the workpiece or the machining attachment.

2. A machine tool according to claim 1, wherein the movable axes comprise linear axes and rotary axes, and the position detector for detecting the position of the linear axis comprises a linear scale having a resolution of 10 nm or less.

3. A machine tool according to claim 1, wherein the position detector for detecting the position of the rotary axis comprises an encoder with a resolution of not greater than one ten-thousandth degree or less, and the rotary axis is directly coupled to a motor to be driven directly thereby.

4. A machine tool according to claim 1, wherein the surface of the workpiece is a side surface including at least one flat face to be parallel or perpendicular to a direction of machining of the workpiece.

5. A machine tool according to claim 1, wherein the machining attachment comprises a rotary machining attachment, and the surface of the machining attachment is a reference surface perpendicular to a rotary axis of a rotary tool of the rotary machining attachment.

6. A machine tool according to claim 1, wherein the machining attachment holds a cutting/scribing tool, and a side face of a shank of the cutting/scribing tool is used as the surface of the machining attachment.

7. A machine tool according to claim 1, wherein the probe is an elongate member made of metal to have a conical shape with a spherical end, and is attached to a distal end of an arm of which orientation is changeable and provided on a magnet holder.

8. A machine tool according to claim 1, wherein the workpiece and the machining attachment are mounted on different rotary tables driven by respective rotary axes of the movable axes, the probe is fixedly arranged on the rotary table on which the machining attachment is mounted when an mounting error of the workpiece is to be corrected, and the probe is fixedly arranged on the rotary table on which the workpiece is mounted when an mounting error of the machining attachment is to be corrected.

9. A machine tool according to claim 8, wherein said correction means automatically corrects the mounting error of the workpiece or the machining attachment by rotating the rotary axis on which the workpiece or the machining attachment is mounted in an opposite direction by an angle of the determined inclination.

10. A machine tool according to claim 1, wherein said correction means automatically corrects machining coordinate values of the machining program in accordance with the determined inclination.

* * * * *